O. P. RICHARDSON.
Spindle for Loom-Shuttle.

No. 221,191.                Patented Nov. 4, 1879.

Witnesses,
W. H. H. Knight

Inventor,
Orville P. Richardson,
by Ellis Spear
Attorney

UNITED STATES PATENT OFFICE.

ORVILLE P. RICHARDSON, OF ATTLEBOROUGH, MASSACHUSETTS.

IMPROVEMENT IN SPINDLES FOR LOOM-SHUTTLES.

Specification forming part of Letters Patent No. 221,191, dated November 4, 1879; application filed April 14, 1879.

*To all whom it may concern:*

Be it known that I, ORVILLE P. RICHARDSON, of Attleborough, county of Bristol, State of Massachusetts, have invented an Improvement in Spindles for Loom-Shuttles, of which the following is a specification.

My invention relates to spindles such as are used in the ordinary loom-shuttles of that class which are split longitudinally, and the parts spread so as to hold the cops by the means of their elasticity.

The object of the first part of my invention is to improve the point of the spindle and to facilitate the formation of the point; and the object of the second part of the invention is to spread the divided part of the spindle, in order to increase the elasticity or outward pressure of the parts, and cause it to hold the cops more securely.

Heretofore it has been customary in making spindles of this class to take two pieces of half-round steel and to weld or solder the ends together to form a point; or the point has been sometimes formed by heating the half-round rods and twisting them together, and afterward reducing them to the proper shape and size.

The head of the spindle has been formed, previous to my invention, by simply bringing the ends of the half-round rods together and welding the head upon them.

In forming my improved spindle, I take a piece of half-round steel, such as has been heretofore used for the purpose, but of about twice the length which is to be given to the finished spindle. This piece of half-round rod I bend in the center, and bring the flat surfaces back in contact with each other. I forge the parts together at the bent end, so as to form the end of the spindle out of this bent portion, and thus make a solid point, easily and cheaply finished, without any welding or twisting, and with very little forging.

In order to form the head the ends of the half-round rod are brought together, and a flat piece of steel is placed between these free ends, so as to hold them slightly apart, and the head is then welded on. A spindle formed in this way is stronger at the point and is less liable to break than spindles made in the old way. The flat piece interposed between the free ends before the head is soldered or welded on serves to keep the spindle well sprung apart under all circumstances.

Figure 1:
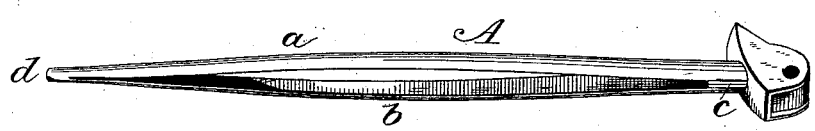
Figure 2:
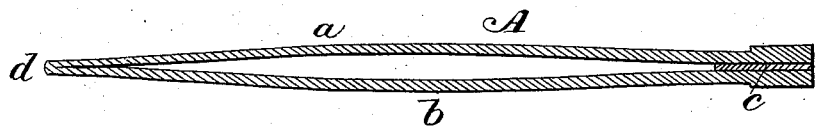

In the drawings, in which Figure 1 is a side elevation and Fig. 2 a longitudinal section, hereunto attached, and forming part of this specification, the spindle A is represented in general form, the same as has been heretofore used.

The parts $a\,b$ are made of ordinary half-round rod. The point $d$ is formed in the manner described, by bending the rod $a\,b$ at the point $d$, and bringing the parts together, so as to be in contact with each other for a part of their length, and to be sprung apart sufficiently to hold by their elasticity the cop upon the spindle.

The piece interposed between the two parts $a\,b$ is shown at $c$, and is made of a length and thickness suited to the purpose of holding the parts $a$ and $b$ asunder.

Having thus described my invention, what I claim as new, and desire to secure by Letters Patent of the United States, is—

1. In the manufacture of spindles of the described class, the process of forming them out of half-round rod by bending at the center and folding the bent rod upon itself, and forging the end of the spindle out of the bent part of the rod, as set forth.

2. A divided spindle the point of which is formed of half-round rod bent upon itself, as and for the purpose set forth.

3. In combination with the two parts $a\,b$, forming a spindle, the piece $c$, interposed between the said parts at the head, as and for the purpose set forth.

In testimony whereof I have signed my name to this specification in the presence of two subscribing witnesses.

ORVILLE P. RICHARDSON.

Witnesses:
HAMLET W. WHEATON,
CHARLES H. WHITNEY.